(12) United States Patent
Safran et al.

(10) Patent No.: US 7,237,380 B1
(45) Date of Patent: Jul. 3, 2007

(54) COMPACT ACTUATOR

(75) Inventors: Les Safran, Westlake, OH (US); Stephen L. Douglass, Newbury, OH (US)

(73) Assignee: Thermotion Corporation, Mentor, OH (US)

( * ) Notice: Subject to any disclaimer, the term of this patent is extended or adjusted under 35 U.S.C. 154(b) by 0 days.

(21) Appl. No.: 11/563,767

(22) Filed: Nov. 28, 2006

(51) Int. Cl.
*F01B 29/00* (2006.01)
(52) U.S. Cl. .............................. 60/513; 60/515; 60/530
(58) Field of Classification Search ................. 60/508, 60/512, 513, 515, 530
See application file for complete search history.

(56) References Cited

U.S. PATENT DOCUMENTS

| | | | |
|---|---|---|---|
| 2,699,072 A * | 1/1955 | Wrinkle ........................ 74/363 |
| 4,442,670 A * | 4/1984 | Goldman ...................... 60/517 |
| 4,759,189 A | 7/1988 | Stropkay et al. |
| 4,887,429 A | 12/1989 | Birli, Sr. et al. |
| 5,203,171 A | 4/1993 | Petot et al. |
| 6,332,318 B1 * | 12/2001 | Thorn ........................ 60/512 |

* cited by examiner

*Primary Examiner*—Hoang Nguyen
(74) *Attorney, Agent, or Firm*—Leydig, Voit & Mayer, Ltd.

(57) ABSTRACT

A compact electrothermal actuator includes a housing having a longitudinal axis. A slot extends through the housing. A chamber within the housing contains a working fluid that changes phase upon heating. A piston is slidably disposed within the housing and movable along the longitudinal axis between first and second positions. A spring biases the piston toward the first position. The piston slides from the first position to the second position in response to heating of the working fluid. The piston includes a guide pin extending transverse to the longitudinal axis and protruding into the slot. The slot may be linear or helical for sliding of the piston between the first and second positions without or with rotation of the piston. The length of the actuator, measured along the longitudinal axis, is constant, independent of the position of the piston within the housing.

19 Claims, 8 Drawing Sheets

COMPACT ACTUATOR

FIELD OF THE INVENTION

The present invention relates to actuators in which linear motion of an object is produced in response to electrical power. The invention particularly relates to compact actuators having external dimensions that do not change during operation of the actuator.

BACKGROUND OF THE INVENTION

Actuators producing mechanical movement of an object in response to the application of electrical power are well known. Among the types of actuators that respond to the application of electrical power to produce mechanical motion are electrothermal actuators. Examples of such actuators are described in U.S. Pat. Nos. 4,759,189, 4,887,429, and 5,203,171, which are incorporated by reference. Within these electrothermal actuators, a closed chamber contains a working fluid. The working fluid is mostly a liquid at ambient temperature and changes phase to become a gas, when heated. That gas phase of the working fluid expands upon continued heating, increasing internal pressure within the chamber. (In the following description, the reference to the working fluid encompasses both of the liquid and gas phases of that fluid, the gas phase expanding upon heating to provide the motive force of the actuator.)

The chamber includes an electrically powered heater that supplies heat to the fluid, in response to an electrical current supplied to the heater. The heat produces the phase change in the working fluid and the pressure increase within the chamber. In response to the increased internal pressure in the chamber, a flexible rolling diaphragm, usually peripherally clamped to the package of the electrothermal actuator, is displaced. The diaphragm displacement pushes a piston that drives a piston rod in a linear direction, increasing the extent of protrusion of the piston rod from the package of the electrothermal actuator. Thus, upon activation and extension of the piston rod, the overall length of the actuator significantly increases.

When electrical power is removed from the heater and pressure in the chamber decreases, the piston rod retracts so that the original overall length of the actuator is restored. Typically, an electrothermal actuator includes a return spring urging the piston to withdraw the piston rod into the package of the actuator. The expansion of the working fluid provides a force that counteracts the restoring force of that return spring.

In many potential applications of electrothermal actuators, there is little space. Thus, the conventional electrothermal actuator cannot be used in these applications.

SUMMARY OF THE INVENTION

Accordingly, it is desirable to provide an actuator supplying a motive force and mechanical movement to a mechanical device coupled to the actuator, but in which the overall external dimensions of the actuator, including length, do not change regardless of the actuation state of the actuator.

An actuator according to the invention includes a housing having a part with a generally cylindrical interior that has a longitudinal axis. The housing includes a slot that extends through the housing. A chamber within the housing contains a working fluid that changes phase upon heating. An electrical heater is disposed within the chamber for heating the working fluid upon application of electrical power to the electrical heater. A piston is slidably disposed within the housing and movable along the longitudinal axis between first and second positions within the housing. A spring biases the piston toward the first position. The piston is driven and slides from the first position to the second position in response to heating of the working fluid by the electrical heater. The piston includes a guide pin extending transverse to the longitudinal axis and protruding into the slot for guiding sliding movement of the piston. The guide pin is coupled to an external mechanical device, transmitting the movement of the piston to the mechanical device. The length of the actuator, measured along the longitudinal axis, is constant, independent of the position of the piston within the housing.

The actuator may include a pair of slots and a pair of guide pins may extend from the piston and protrude into respective slots. The slots may be linear, i.e., parallel to the longitudinal axis, or helical. If the slot or slots are helical, the piston rotates about the longitudinal axis in moving between the first and second positions. In that case, a second piston is preferably interposed between the diaphragm and the piston to prevent transmission of torsion from the piston to the diaphragm when the piston rotates in moving between the first and second positions.

BRIEF DESCRIPTION OF THE DRAWING FIGURES

In all figures like elements are given the same reference numbers to avoid the necessity of duplicate description

DETAILED DESCRIPTION

Figure 1:
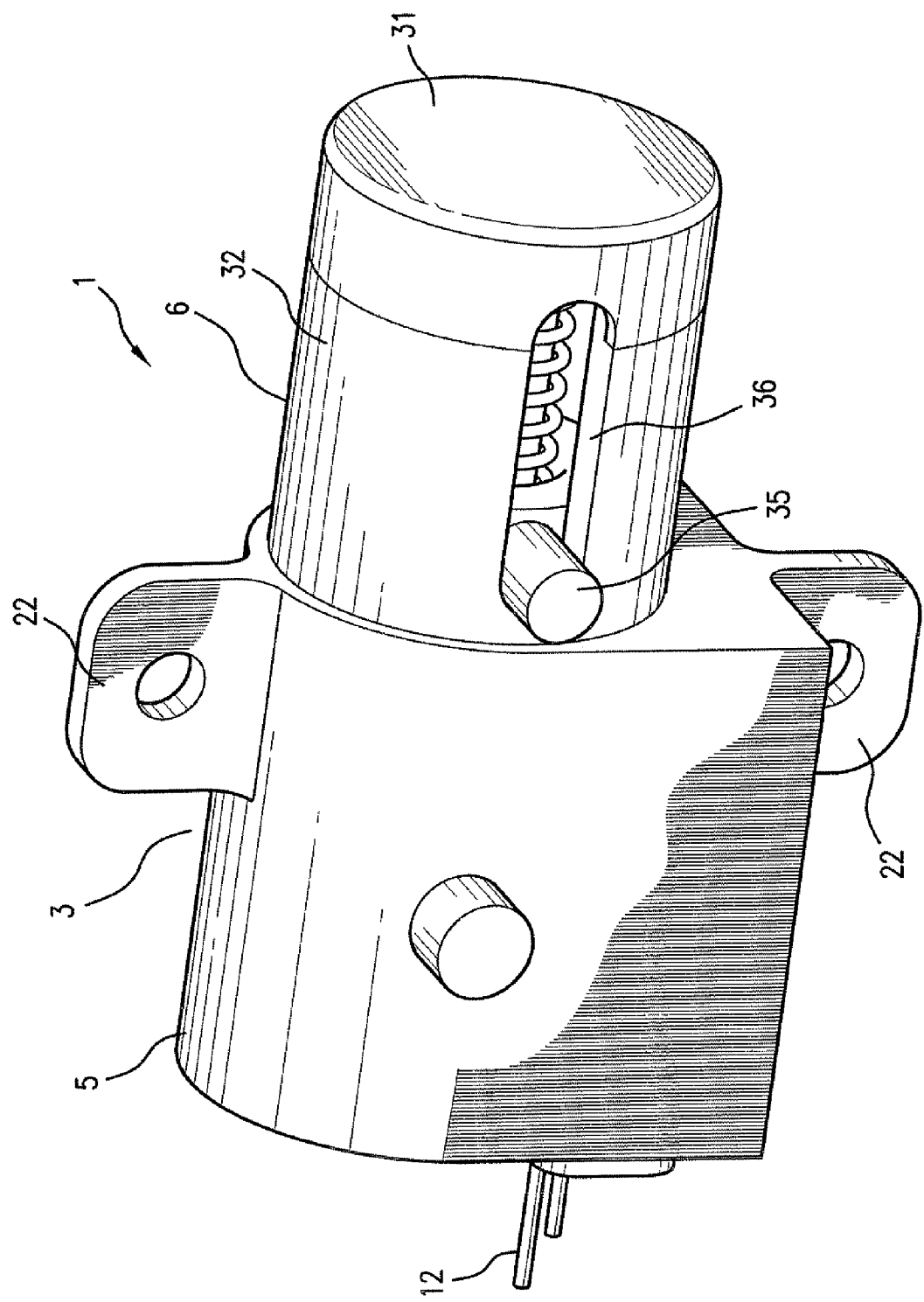
FIG. 1 is an exterior perspective view of an actuator according to a first embodiment of the invention.

FIGS. 1-4 show, in different views, a first embodiment of an actuator 1 according to the invention. The actuator 1 includes a housing 3 including a rear housing part 5 and a front housing part 6. The front and rear housing parts 5 and 6 are preferably molded plastic parts that are bonded together, for example by ultrasonic welding. Of course, those parts could be metallic and joined by any conventional process. When the housing parts are made of plastic, the plastic must be able to withstand the maximum temperature of the heater and the working fluid.

The rear housing part 5 includes a chamber 10 (see FIG. 3) that contains the working fluid, frequently a fluorocarbon. The chamber also houses an electrical heater 11, shown in the form of a disk, with electrical leads 12 that pass through a plug 13 that closes a hole in the rear housing part 5.

Preferably, the plug 13 is plastic and is ultrasonically welded to the surfaces of the rear housing part that define the opening filled by the plug. The plug 13 may include a fill-hole for injecting the working fluid into the chamber 10. Where such a fill-hole is present, the fill-hole is closed after injecting the working fluid, for example, by a screw 14 seen in FIG. 4. The chamber 10 may be sealed by other techniques, such as the plugging of a fill-hole and filling electrical feedthroughs with a potting compound. Most preferably, the heater 11 is a positive temperature coefficient heater that increases in resistance with an increase in temperature, self-regulating the maximum temperature that the heater reaches for a particular voltage applied across the heater leads 12.

Figure 2:
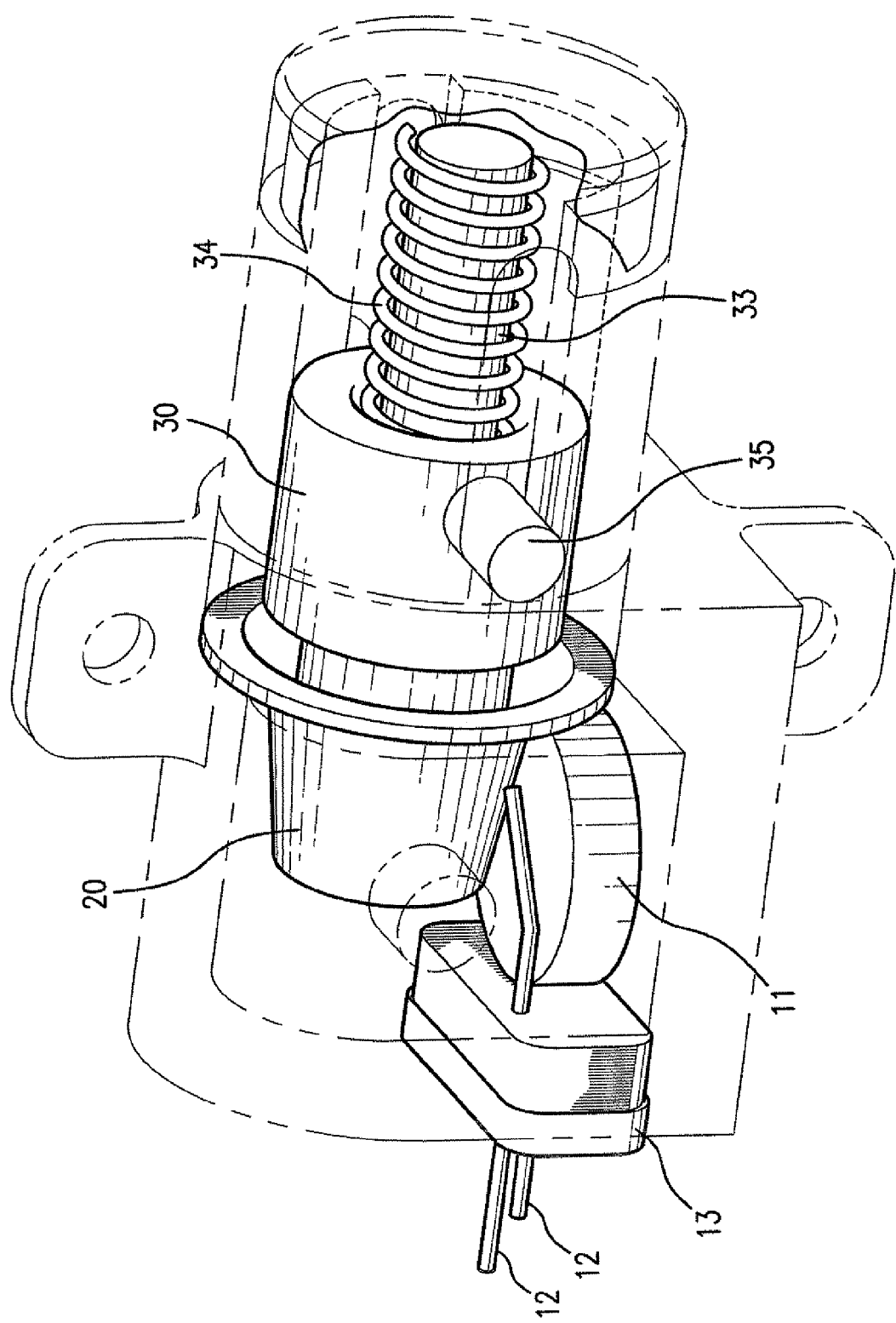
FIG. 2 is a perspective view of the actuator embodiment of FIG. 1 with the housing shown as transparent.
Figure 3:
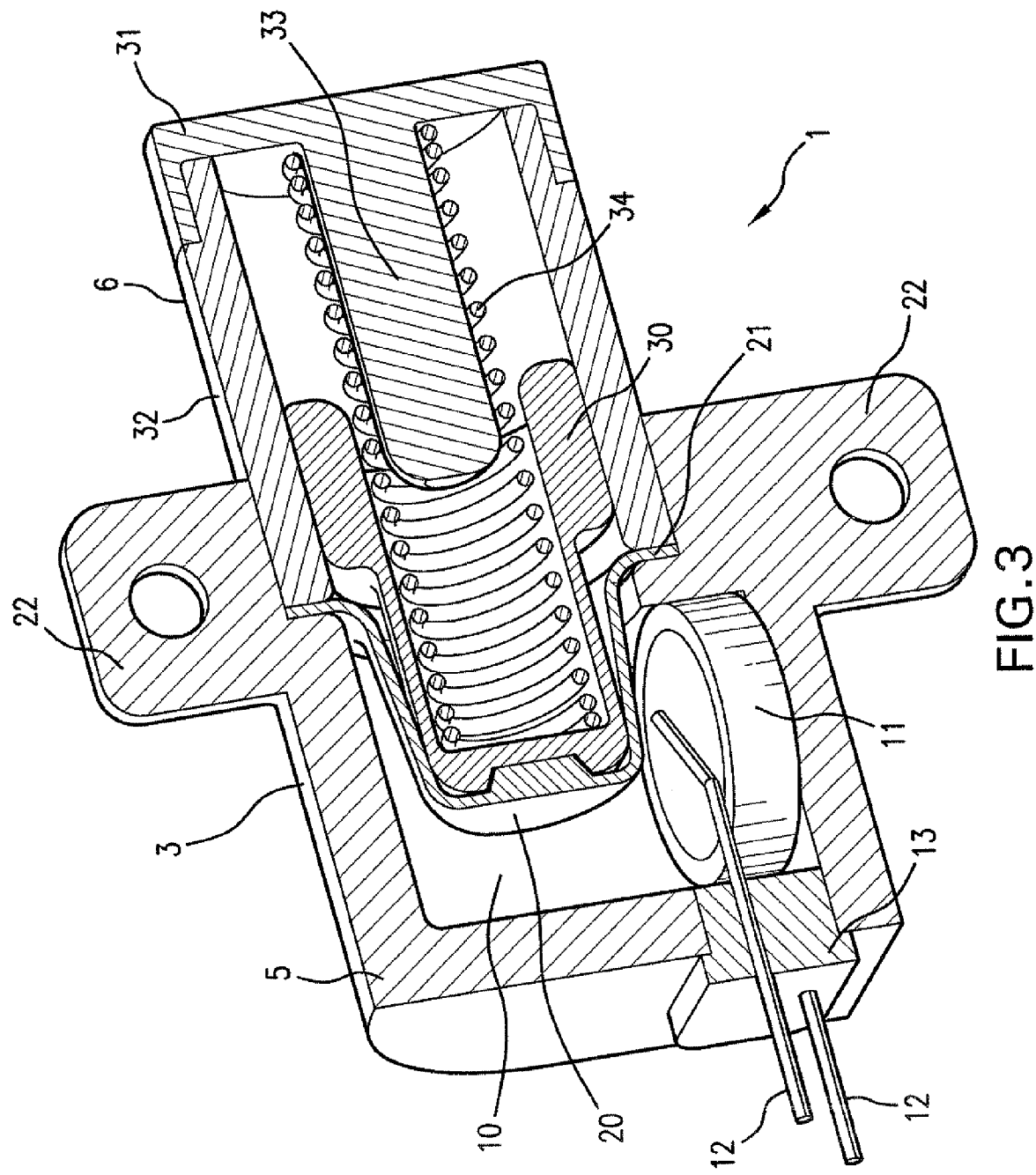
FIG. 3 is a cross-sectional view of the actuator embodiment of FIG. 1 taken along a plane including the longitudinal axis of the actuator.

A forward wall of the chamber 10 is defined by a rolling diaphragm 20 (see FIGS. 2-4) that has, as shown in FIG. 3, a top hat or a pilgrim hat shape. That diaphragm, which is a single piece of elastomeric or other flexible material, includes a peripheral flange 21, corresponding to the brim of the hat shape. That peripheral flange 21 is preferably clamped between the rear and front housing parts 5 and 6. A generally tubular portion of the rolling diaphragm extends from the flange 21 to a top part of the top hat shape of the rolling diaphragm. The top part has first side that faces the working fluid within the chamber 10 and an opposite, second side that engages a piston 30 which is described further below. In the illustrated embodiment of the invention, the rear housing part 5 includes two external mounting flanges 22 that extend in diametrically opposite directions from the external surface of the rear housing part. These mounting flanges 22 include holes for mounting the actuator with fasteners or on corresponding posts received within the holes of the mounting flanges.

The front housing part 6 includes two parts, a cap 31 and a slotted tube 32. The cap 31 engages and closes one end of the slotted tube 32. In the illustrated embodiment, the cap 31 is generally circular and includes a centrally located aligning pin 33 extending into and coaxial with the slotted tube 32. These parts, the cap 31 and the slotted tube 32, are preferably molded plastic and the parts are preferably ultrasonically welded together. However, other bonding techniques and materials can be employed in embodiments of the invention. An end of the slotted tube 32 opposite the cap 31 is preferably received within and is bonded to the rear housing part 5, clamping the peripheral flange 21 of the diaphragm 20.

The slotted tube 32 is, internally, generally cylindrical and thus has a central longitudinal axis. As described, the alignment pin 32 extending from the cap 31 is aligned along that axis. A piston 30 is slidably disposed within the slotted tube 32 and can move from a first position, maximally intruding into the chamber 10 as illustrated in FIGS. 2 and 3, to a second position, not illustrated, in which the piston is much closer to the cap 31. This sliding movement occurs along the longitudinal axis of the slotted tube 32.

To facilitate the sliding, the piston 30 preferably has a circular cross-section with a larger outside diameter bearing portion at the end of the piston 30 that is remote from the chamber 10. A smaller diameter rear portion of the piston 30 engages the diaphragm 20. Preferably, the top part of the diaphragm 20 includes a thickened part that is received in a complementary recess in the piston to aid in maintaining engagement of the piston 30 and diaphragm 20 and alignment of the piston. While the end of the piston engaging the diaphragm is closed, the piston preferably has a hollow core.

Figure 4:
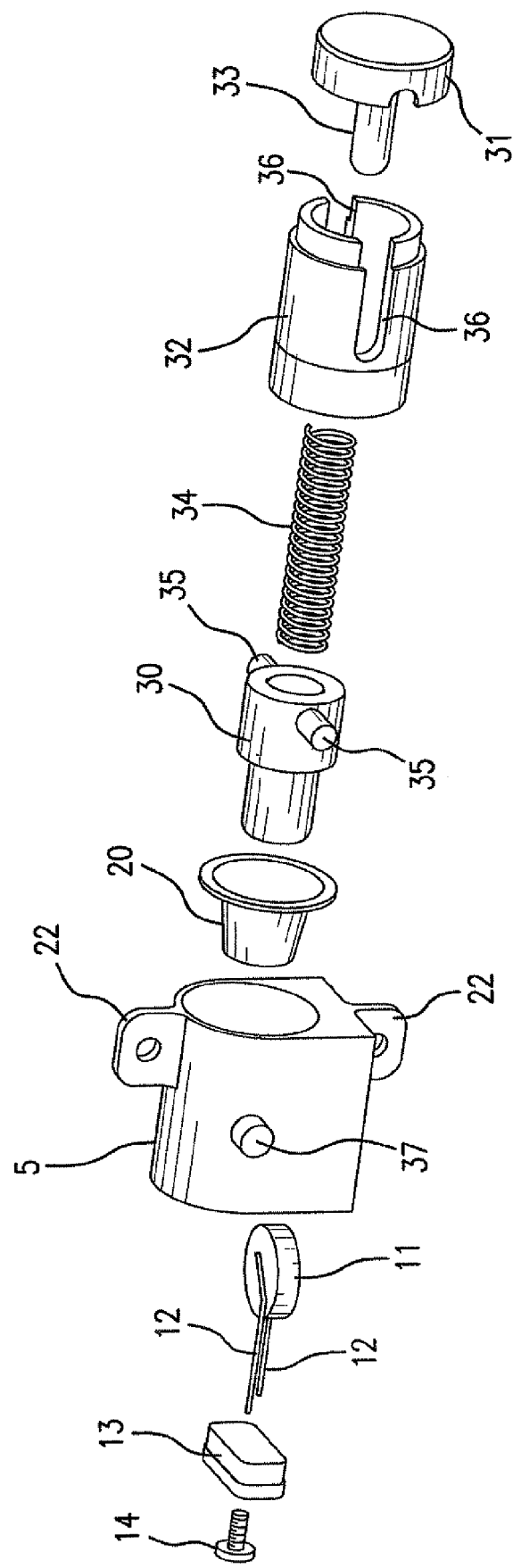
FIG. 4 is an exploded view of the actuator embodiment of FIG. 1.

As shown in FIGS. 2-4, one end of a coil spring 34 is mounted on the alignment pin 33 so part of the spring 34 surrounds the alignment pin 33. The opposite end of the spring 34 extends into the hollow core of the piston 30. Thus, the coil spring 34 urges the piston into the first position illustrated in FIGS. 1-3. The respective engagements of the ends of the coil spring keep the coil spring in the desired position.

The slotted tube 32 includes two longitudinal slots 36, i.e., slots generally parallel to the longitudinal axis of the tube 32. Those slots are shown as positioned at diametrically opposite positions on the tube 32, but that positioning is not essential to the invention. Further, the number of slots is not limited to two. Fewer or more slots may be provided. However, the slots in this embodiment are aligned with the longitudinal axis of the slotted tube 32 and guide linear motion of the piston 30.

As seen in FIGS. 1, 2, and 4, the piston 30 includes a pair of guide pins 35 extending from the piston, preferably along a common axis that is transverse to the longitudinal axis of the slotted tube 32. The guide pins 35 are slidably received in respective slots 36 of the slotted tube 32. Most preferably, the guide pins 35 fit snugly within the longitudinal slots 36, so the surfaces of the slots and guide pins have some contact limiting the movement of the piston 30 to longitudinal sliding. Of course, the guide pins 35 are sufficiently free to move within the slots 36 so as not to interfere with the sliding movement of the piston 30. The guide pins 35 may protrude from the slots beyond the outside surface of the tube 32 or may be contained within the slots.

Although not shown, the guide pins 35 are coupled to an external mechanical device to transmit the motion of the piston 30 to that mechanical device. That coupling may be by any conventional means such as screws engaging the guide pins, with or without internal threads, use of threaded guide pins engaging an element with complementary threads, springs or hooks engaging the guide pins, and similar couplings.

In the initial, unactuated state of the actuator, the spring 34 urges the piston 30 toward the chamber 10. In that position, the guide pins 35 extending from opposite sides of the piston 30 extend into the slots 36. The pins are positioned near or at the ends of the slots 36 that are closest to the chamber 10. When electrical power is applied through the leads 12 to the heater 11, the working fluid within the chamber is heated, the fluid changes phase from a liquid to a gas, and pressure within the chamber increases. When the pressure increases sufficiently so that the force applied to the end of the piston covered by the diaphragm 20 exceeds the force applied to the piston 30 by the spring 34, and the piston 30 slides within the slotted tube 32 toward the cap 31. The movement of the piston slides the guide pins 35 within the slots 36 toward the cap 31. The external mechanical device coupled to the pins 35 is thus actuated and moved in response to the electrical stimulus. In this embodiment, that movement is linear. Notwithstanding this movement, the external dimensions of the actuator do not change during this movement. The location of the guide pins 35 changes but, unlike an actuator with an extending and retracting piston rod, there is no change in any overall dimension of the actuator according to the invention, before, during, or after the sliding of the piston 30 between the first and second positions and vice versa.

When power is no longer supplied to the heater 11 through the leads 12, the working fluid within the chamber 10 cools and returns to the liquid phase, reducing pressure within the chamber 10. Under the influence of the spring 34, the piston 30 slides toward the chamber and is restored to the first position. Again, in this movement, there is no change in the overall external dimensions of the actuator, only a relocation of the guide pins 35, to the extent those guide pins even protrude from the slots 36.

Numerous variations of the actuator are readily apparent to those of ordinary skill in the art. For example, all actuator according to the invention may include only a single guide pin 35 and a single corresponding longitudinal slot 36 in the slotted tube 32. Further, the two guide pins 35 need not be axially aligned, as illustrated in the preferred embodiment, and more than two such guide pins can be employed with corresponding slots. The slotted tube 32, while most preferably received within the rear housing part 5 to clamp the peripheral flange 21 of the diaphragm 20 reliably, might simply abut an external surface of the rear housing part 5. As shown in FIG. 4, the rear housing part 5 may include integrally molded posts 37 for assistance in mounting, alignment, and/or manufacture of the actuator.

FIGS. 5-8 show, in different views, a second embodiment of an actuator 1' according to the invention. The actuator 1' includes substantially all of the elements of the actuator 1. Therefore, the following description concerning the actuator embodiment 1' is directed only to features that are different from those of the actuator 1 of the first embodiment. The features of the actuator 1' according to the second embodiment that commonly appear in the first embodiment are not described a second time.

Figure 5:
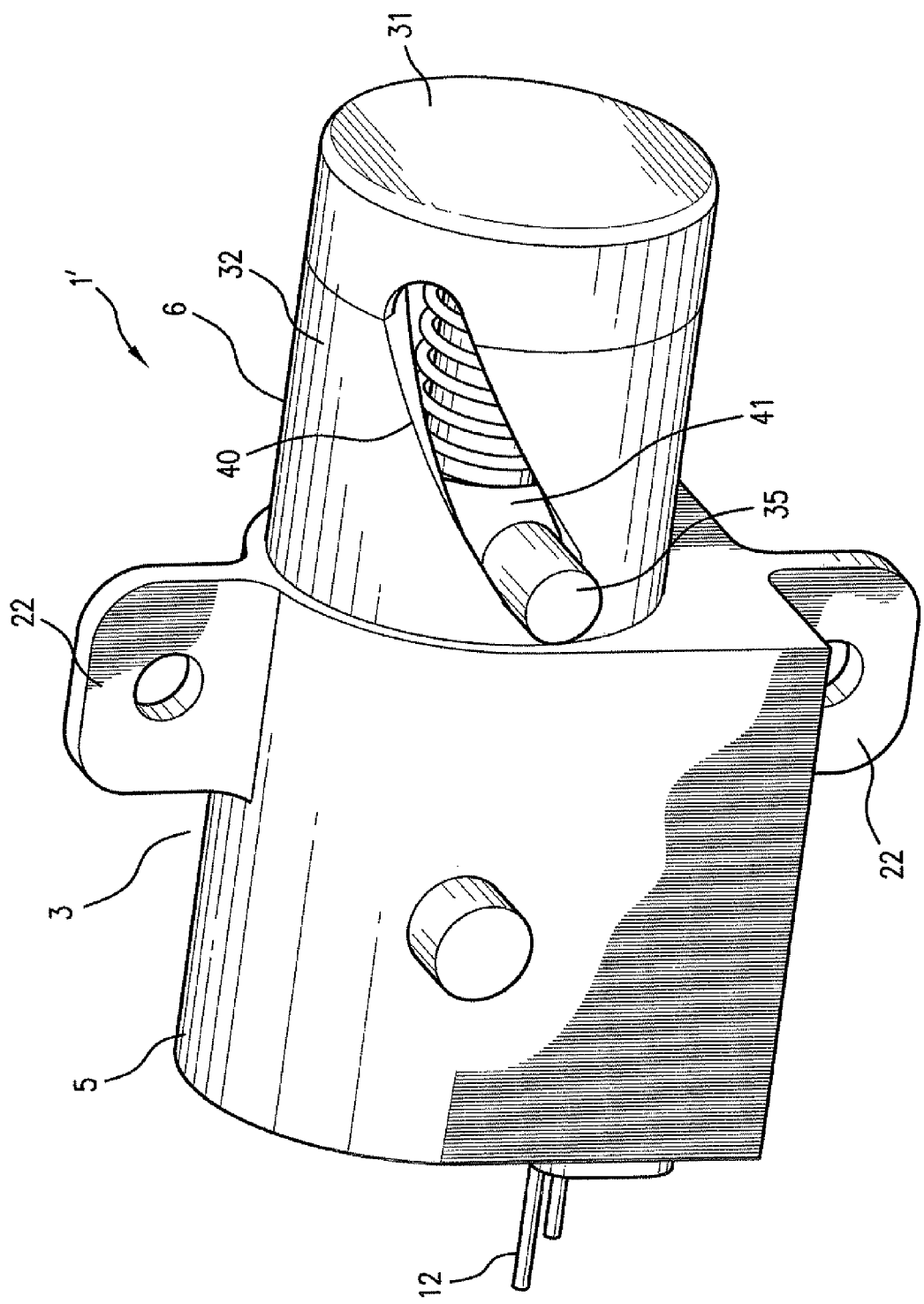
FIG. 5 is an exterior perspective view of an actuator according to a second embodiment of the invention.
Figure 6:
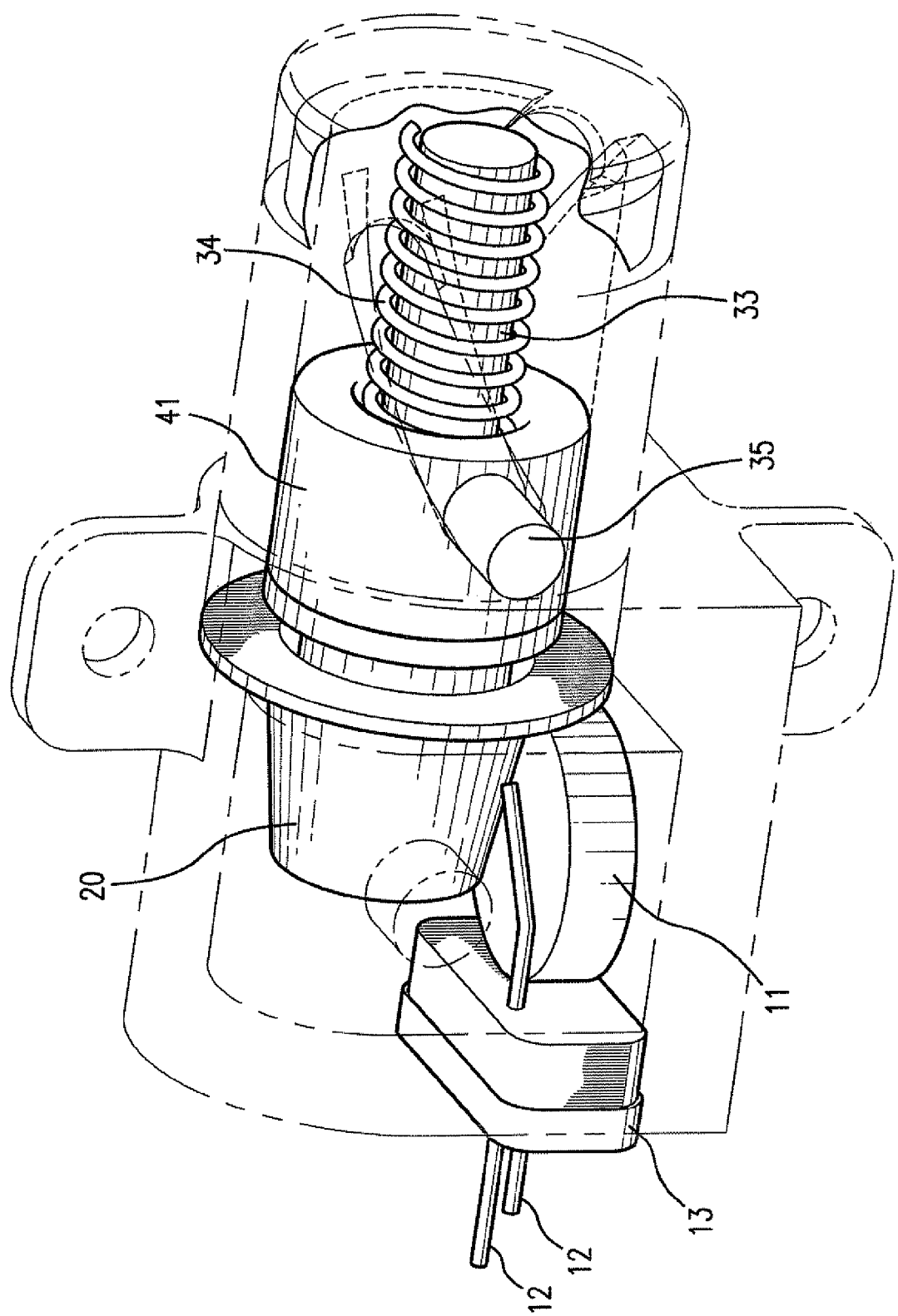
FIG. 6 is a perspective view of the actuator embodiment of FIG. 5 with the housing shown as transparent.
Figure 7:
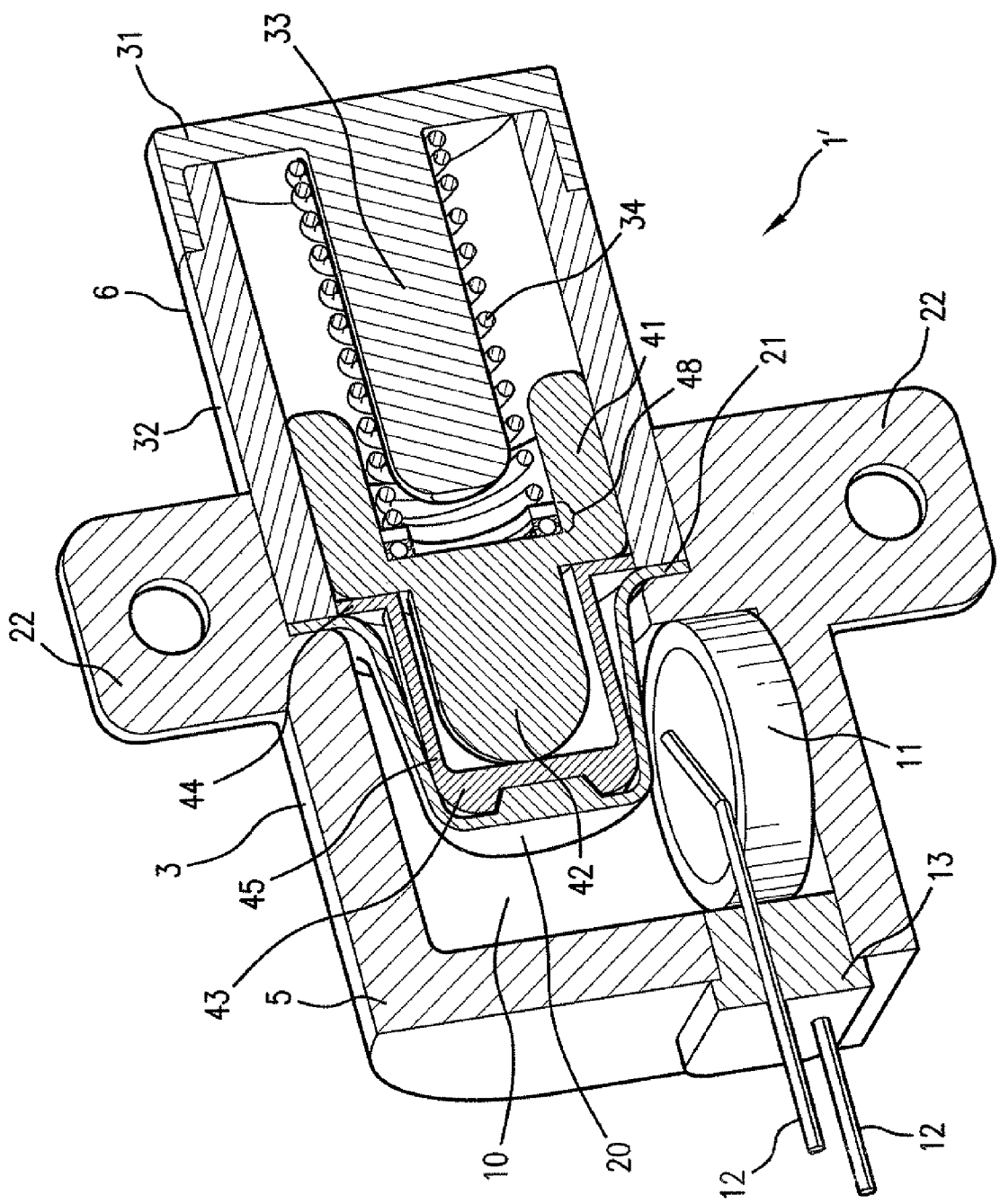
FIG. 7 is a cross-sectional view of the actuator embodiment of FIG. 5 taken along a plane including the longitudinal axis of the actuator.
Figure 8:
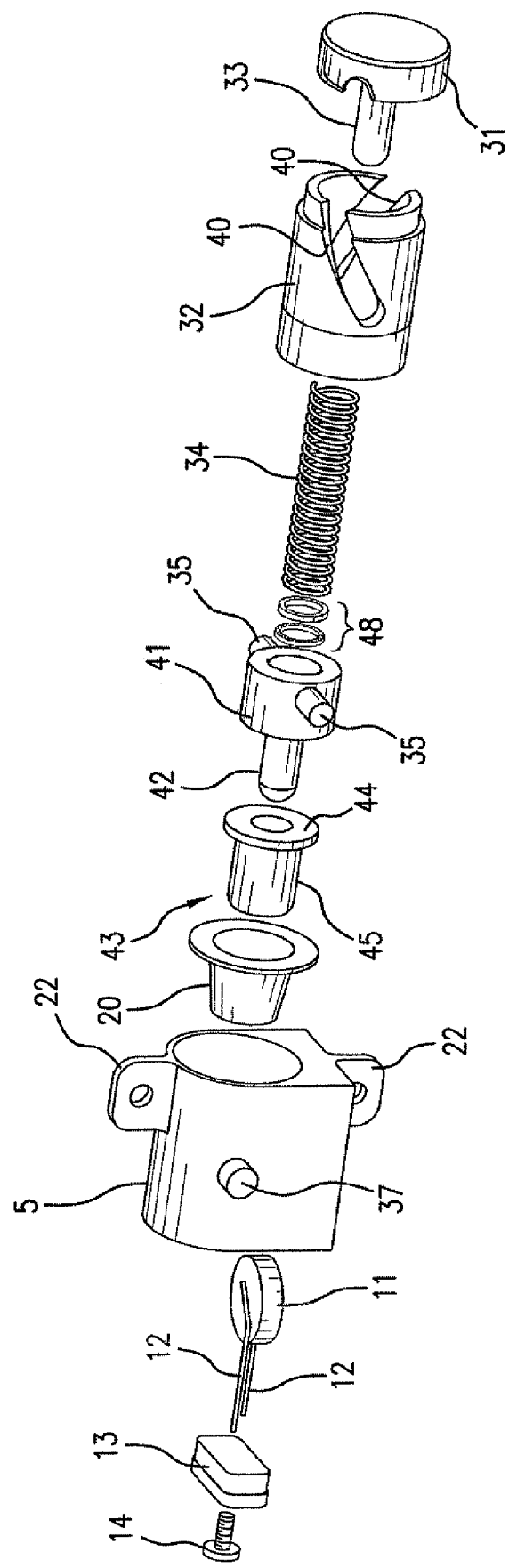
FIG. 8 is an exploded view of the actuator embodiment of FIG. 5.

An important difference between the actuator of FIGS. 1-4 and the actuator of FIGS. 5-8 concerns the shape of the slots in the housing in which the guide pin or guide pins 35 travel when a first piston 41 moves between the first and second positions. In the first embodiment, those slots 36 are linear and aligned with, i.e., parallel to, the longitudinal axis of the front housing part 6. In the embodiment of FIGS. 5-8, the slot or slots 40 are helical as indicated in FIGS. 5, 6, and 8. The slot or slots 40 are referred to as helical because these arcuate slots lie along a part of a helix traced on the front housing part 6. When two helical slots 40 extend through the front housing part 6 and the cap 31 and the first piston 41 advances from the first position, as shown in that FIG. 5, toward the second position, the guide pin 35 rises with the curvature of the helical slot 40. When a diametrically opposed guide pin 35 is present on the opposite side of the first piston 41, the slot 40 receiving that other guide pin a complementary curvature with the same chirality as the other slot 40. Otherwise, the first piston 41 could not advance from the first position to the second position. The degree of rotation of the first piston in moving between the first and second positions depends upon the pitch of the helical slots and the distance moved by the first piston along the longitudinal axis between the first and second positions.

It follows from the foregoing description that as the guide pin or guide pins 35 are moved by the first piston 41 toward the second position, the first piston 41 rotates with respect to and about the longitudinal axis. In order to provide for that rotation without placing torsional stress on internal parts of the actuator, the structure of the first piston 41 is different from the structure of the piston 30 of the first embodiment. The difference in the structure of the first piston 41, as compared to the piston 30, is most easily observed in FIGS. 7 and 8.

As shown in FIGS. 7 and 8, the first piston 41 includes, at the side facing the spring 34, an opening for receiving one end of the spring 34. At the opposite side of the first piston 41, facing the chamber 10, a bearing pin 42 having a spherical or rounded tip and extending along the longitudinal axis protrudes from the body of the first piston 41.

A second piston 43 is interposed between the first piston 41 and the diaphragm 20. The second piston 43 is preferably made of a plastic material with a low coefficient of friction. The second piston 43 includes a peripheral collar or flange 44 that bears upon the body of the first piston 41 and some parts of the diaphragm 20, for example, near the flange 21. The flange 44 surrounds an opening in a tubular part 45 of the second piston 43 that receives the bearing pin 42 of the first piston 41. The tubular part of the second piston 43 has a closed end wall contacted by the bearing pin 42. No part of the bearing pin 42 comes into contact with the diaphragm 20. Therefore, when the first piston 41 moves between the first and second positions and rotates, the second piston 43 permits and facilitates that rotation through the limited contact between the spherical or rounded end of the bearing pin 42 and the end wall at the bottom of the tubular part 45 of the second piston 43. As a result, no torsional force is transmitted to the diaphragm 20, which could be damaged by repeated torsional cycles.

Optionally, a thrust bearing 48 may be placed within the hollow part of the first piston 41 to engage an end of the spring 34. The thrust bearing includes captured ball bearings and an adjacent washer or race that permits free rotation of the washer with respect to the ball bearings. Therefore, the spring 34 does not experience torsional stresses as the piston rotates clockwise and counterclockwise about the longitudinal axis in moving between the first and second positions. The positioning of the optional thrust bearing 48 is not limited to a location within the first piston 41. The thrust bearing 48 can also be mounted on the alignment pin 33 of the cap 31 between the cap and the end of the spring 34 adjacent the cap. Either location is sufficient to relieve torsional stresses on the spring. As a further, more complex and expensive option, still another thrust bearing could be employed if the first piston 41 includes two parts, for example, if the bearing pin 42 were separate from but received within the body of the first piston 41.

The invention as exemplified by the illustrated second embodiment is not limited to the structure of that second embodiment. For example, as with the first described embodiment, it is intended that the guide pins 35 fit sufficiently closely within the slots 40 so that the slots guide the movement of the first piston 41 between the first and second positions without binding. The degree of curvature of the slots 40 may be greater than illustrated in the figures provided the design permits free movement of the guide pins 35 within the slots 40 as the first piston 41 moves between the first and second positions.

The foregoing description pertains to particular, preferred embodiments of the invention. However, this description is not intended to limit the invention to the particular embodiments illustrated and described. The scope of the invention is defined solely by the following claims.

We claim:

1. An actuator comprising:
   a housing having a part with a generally cylindrical interior that has a longitudinal axis, the housing including a first slot extending through the housing;
   a chamber within the housing and containing a working fluid that changes phase upon heating;
   an electrical heater disposed within the chamber for heating the working fluid upon application of electrical power to the electrical heater;
   a first piston slidably disposed within the housing and movable along the longitudinal axis between first and second positions within the housing, wherein the first piston is driven and slides from the first position to the second position in response to heating of the working fluid by the electrical heater, and the first piston includes a first guide pin extending transverse to the longitudinal axis and protruding into the first slot for guiding sliding movement of the first piston and coupling to an external mechanical device, wherein length of the actuator, measured along the longitudinal axis, is constant, independent of the position of the first piston; and a spring biasing the first piston toward the first position.

2. The actuator according to claim 1 comprising a rolling diaphragm contacting the first piston, separating the chamber from the first piston, driven by the working fluid, and sliding the first piston toward the second position upon expansion of the working fluid.

3. The actuator according to claim 2, wherein the rolling diaphragm has a peripheral flange clamped by the housing.

4. The actuator according to claim 1, wherein the part of the housing comprises a tubular portion including the first slot and a cap mounted on and closing one end of the tubular portion.

5. The actuator according to claim 4, wherein the cap includes an alignment pin extending into the housing and surrounded by a first end of the spring.

6. The actuator according to claim 5, wherein the piston has a hollow portion that receives a second end of the spring.

7. The actuator according to claim 1, wherein the first slot is linear and generally parallel to the longitudinal axis.

8. The actuator according to claim 7, wherein the part of the housing comprises a tubular portion and a cap mounted on and closing an end of the tubular portion.

9. The actuator according to claim 7, wherein the part of the housing includes a second slot that is linear and the first piston includes a second guide pin extending transverse to the longitudinal axis and protruding into the second slot.

10. The actuator according to claim 9, wherein the part of the housing comprises a tubular portion including the first and second slots and a cap mounted on and closing an end of the tubular portion.

11. The actuator according to claim 1, wherein the first slot is helical.

12. The actuator according to claim 11 including a rolling diaphragm and a second piston interposed between the first piston and the rolling diaphragm and preventing transmission of torsion from the first piston to the rolling diaphragm, wherein the rolling diaphragm separates the chamber from the second piston, is driven by the working fluid, and slides the first piston toward the second position upon expansion of the working fluid.

13. The actuator according to claim 12, wherein the first piston includes a bearing pin extending along the longitudinal axis toward the chamber and the second piston includes a tubular portion having an end wall disposed between and contacting the bearing pin and the diaphragm.

14. The actuator according to claim 13, wherein the bearing pin includes a rounded end contacting the end wall of the second piston.

15. The actuator according to claim 11 including a thrust bearing interposed between the spring and the first piston and preventing transmission of torsion to the spring.

16. The actuator according to claim 15, wherein the part of the housing comprises a tubular portion and a cap mounted on and closing a first end of the tubular portion.

17. The actuator according to claim 11, wherein the part of the housing includes a second slot that is helical and the first piston includes a second guide pin extending transverse to the longitudinal axis and protruding into the second slot.

18. The actuator according to claim 17, wherein the part of the housing comprises a tubular portion including the first and second slots and a cap mounted on and closing a first end of the tubular portion.

19. The actuator according to claim 12, wherein the rolling diaphragm has a peripheral flange clamped by the housing.

\* \* \* \* \*